Patented Nov. 28, 1922.

1,437,139

UNITED STATES PATENT OFFICE.

NATHAN GRÜNSTEIN, OF FRANKFORT-ON-THE-MAIN, GERMANY.

PROCESS FOR THE MANUFACTURE OF ALDOL FROM ACETALDEHYDE.

No Drawing.  Application filed March 14, 1921. Serial No. 452,398.

*To all whom it may concern:*

Be it known that I, NATHAN GRÜNSTEIN, resident of Frankfort-on-the-Main, Germany, have invented certain new and useful Improvements in a Process for the Manufacture of Aldol from Acetaldehyde (for which I have made application in Switzerland, March 18, 1919; Germany, April 20, 1920), of which the following is a specification.

When carrying out in practice condensation of aldol, it often happens that, on the acetaldehyde being mixed with the catalyzer, no reaction takes place for a long time, and then, after further addition of only small quantities, an excessively violent reaction suddenly takes place, which is difficult to regulate, and causes losses of acetaldehyde. It has now been found that this unfavourable course of aldol condensation is caused by the small quantities of acetic acid contained in the acetaldehyde. Aldol condensation only takes place only when the acetaldehyde is alkaline, so that it is necessary first to neutralize the acetic acid contained in the acetaldehyde. Only then the condensation is produced by the addition of a small quantity of a catalyzer with alkaline action. Neutralization and condensation can be however effected by the same reagents, but also by different ones. The acetic acid contained in the acetaldehyde—and even freshly distilled acetaldehyde contains traces of acetic acid—can only be removed with difficulty by solid bases such as have been used hitherto for condensation. To that must be added that in stirring, more particularly at low temperature, acetaldehyde greedily absorbs oxygen from the air, so that in some cases more acetic acid is formed afresh, than the quantity neutralized by the catalyzer. The acetaldehyde remains therefore acid, and no condensation takes place.

According to the present invention, the acetic acid contained in the acetaldehyde, the quantity of which can be easily determined by titration, is neutralized, for instance by the addition of aqueous alkali lye, and then the aldehyde is condensed to aldol by the addition of a catalyzer with alkaline reaction. If further the formation of acetic acid during the process is prevented, which can be done for instance by displacing the oxygen of the air from the stirring vessel by a neutral gas such as for instance nitrogen, the condensation of aldol can be carried out with quite small quantities of compounds having an alkaline reaction, which render the acetaldehyde which is now free from acid, alkaline. As such catalyzers with alkaline reaction can be used caustic alkali in the form of powder, cyanides, oxides and hydroxides of alkaline earths, etc., in solid form, dissolved in water or in the form of a suspension. The use of catalyzers in aqueous form, more particularly in the form of alkali lye, is very advantageous, also the use of anhydrous acetaldehyde or acetaldehyde containing only little water. Thus for instance with less than 1% of alkali lye it is possible to effect a good aldol condensation, whilst up to now it has been impossible, as is well known, to obtain condensation of acetaldehyde without formation of resin, when using caustic alkali. The alkali lye is introduced in portions, the condensation then takes place in an extraordinarily steady uniform manner; the heat of reaction which otherwise often causes an overheating of the acetaldehyde, can be here conveniently discharged by cooling.

If more alkali, for instance 1% caustic soda, and beyond, is used, it is possible even then to obtain a fairly good yield, provided that provision is made for a very strong cooling, and that the caustic soda is neutralized after a short time by acid, owing to which the condensation is prevented from going too far.

It has been further found that condensation of acetaldehyde is strongly effected by the presence of small quantities of water in the acetaldehyde. The addition of only little water to the acetaldehyde results only when the above catalyzers are used, in an acceleration of the reaction and in a strengthening of the action of the catalyzer, so that the condensation can be carried out in a shorter time and, in certain conditions, with smaller quantities of the catalyzer.

Moreover when using water-containing acetaldehyde, also other substances can be advantageously used as catalyzers, which in small quantities do not act on anhydrous acetaldehyde at all, or only very little, such as metals or carbides of alkaline earths, for instance calcium carbide, strontium carbide, or mixtures of the same.

The last named catalyzers could also be used in combination with the aforementioned oxides. The influence of small quantities of water on the reaction will be seen from the following example:

Anhydrous acetaldehyde, which was mixed with 5% of its weight of calcium carbide, was still unmodified after ten days. Acetaldehyde containing 5–10% water, slowly mixed with 2–3% of its weight of calcium carbide, entered into reaction already after a short time; a strong condensation took place, with formation of a thick-fluid product.

For ensuring a good yield of aldol, it is necessary to render the catalyzer harmless during the preparation of the aldol after the condensation. The product of condensation must then no longer show an alkaline reaction, but on the other hand, no excess of mineral acids, for instance hydrochlorid acid, etc., must be used. In certain circumstances it is advantageous to remove the salt separated before the distillation.

It has been found that it is possible, in case of a too violent reaction, to stop the reaction by an addition of acid.

To that end, on the condensation apparatus is mounted a tank with acid, for instance hydrochloric acid, acetic acid, etc.

It is also possible first to convert only a portion of the acetaldehyde into aldol, and then to add to the finished aldol further quantities of acetaldehyde and to condense. This has the advantage that the boiling point of the contents of the reaction vessel is raised, and thus the danger of overheating by the heat of reaction reduced.

The acetaldehyde, before the condensation, can be rendered absolutely free from acetic acid by a separate treatment, for instance by distillation over lime, etc.

*Example 1.*—In a stirring alembic, in which air has been displaced by nitrogen, 1 kg. of freshly distilled acetaldehyde which still contained 0.4% acetic acid, was neutralized by the addition of 13.30 cbc. cm. of a 20% vol. caustic soda. Thereupon, with stirring and strong cooling, another 12 cbc. cm. of the same soda lye were introduced in several portions in the course of several hours. A uniform steady condensation took place, the heat of reaction could be conveniently discharged by cooling, and a temperature of 5–10° C. maintained. From time to time samples were taken in order to ascertain titrometrically the aldol quantity formed. By passing through nitrogen, care was taken to prevent the acetaldehyde from coming into contact with the oxygen of the air, and any air from being drawn in during the cooling, so as to avoid an oxidation of the acetaldehyde to acetic acid. After several hours, the titration showed 70% aldol with 30% acetaldehyde. The required quantity of hydrochloric acid was then added, and the product distilled. In addition to the unmodified acetaldehyde which could be again introduced into the process, a good yield of aldol was obtained. The residue was very small.

In certain circumstances it is advantageous, after the main condensation is finished, which is characterized by strong generation of heat, to leave the reaction product to stand for some time in order to obtain aldol solution of the greatest concentration.

*Example 2.*—In the same conditions as in the Example 1, 1 kg. acetaldehyde was neutralized with 33.3 cbc. cm. of 10% vol. soda lye, thereupon 18 cbc. cm. water were added, and in portions of 0.5 gr. finely powdered calcium carbide was introduced, with stirring and cooling. A uniform condensation took place; after 3–4 hours was added the required quantity of hydrochlorid acid, the salt separated was removed, and half of the thick fluid product obtained, distilled in a vacuum. Aldol was obtained with a good yield. When distilling at the ordinary pressure, croton-aldehyde is obtained, as is well known.

I claim:

1. A process for the manufacture of aldol from acetaldehyde, which consists in first rendering acetaldehyde free from the acetic acid contained in the acetaldehyde and then condensing the aldehyde to aldol by the addition of a catalyzer with alkaline reaction.

2. A process for the manufacture of aldol from acetaldehyde, which consists in first neutralizing the acetic acid contained in the acetaldehyde by aqueous caustic alkali and then condensing the acetaldehyde to aldol by the addition of a catalyzer with alkaline reaction.

3. A process for the manufacture of aldol from acetaldehyde which consists in first neutralizing the acetic acid contained in the acetaldehyde and then condensing the aldehyde to aldol by the addition of a catalyzer with alkaline reaction, the condensation being carried out, for the purpose of reducing the consumption of the catalyzer, with the exclusion of the oxygen of the air the formation of acetic acid thus being prevented.

4. A process for the manufacture of aldol from acetaldehyde, which consists in first neutralizing the acetic acid contained in the acetaldehyde by aqueous caustic alkali and then condensing the acetaldehyde to aldol by the addition of a catalyzer with alkaline reaction, the condensation being carried out, for the purpose of reducing the consumption of the catalyzer, with the exclusion of the oxygen of the air, the formation of acetic acid thus being prevented.

5. A process for the manufacture of aldol from acetaldehyde which consists in first neutralizing the acetic acid contained in the acetaldehyde and then condensing the acetaldehyde to aldol by the addition of chemicals with alkaline reaction, which render the acetaldehyde slightly alkaline.

6. A process for the manufacture of aldol from acetaldehyde which consists in first neutralizing the acetic acid contained in the acetaldehyde and then condensing the acetaldehyde to aldol by the addition of chemicals with alkaline reaction, which render the acetaldehyde slightly alkaline.

7. A process for the manufacture of aldol from acetaldehyde which consists in first neutralizing the acetic acid contained in the acetaldehyde and then condensing the acetaldehyde to aldol by the addition of chemicals with alkaline reaction, which render the acetaldehyde slightly alkaline.

8. A process for the manufacture of aldol from acetaldehyde which consists in first neutralizing the acetic acid contained in the acetaldehyde and then condensing the acetaldehyde to aldol by the addition of a solution of compounds with alkaline reaction.

9. A process for the manufacture of aldol from acetaldehyde which consists in first neutralizing the acetic acid contained in the acetaldehyde by aqueous caustic alkali and then condensing the acetaldehyde to aldol by the use of aqueous alkali.

10. A process for the manufacture of aldol from acetaldehyde which consists in first neutralizing the acetic acid contained in the acetaldehyde by aqueous caustic alkali and then condensing the acetaldehyde to aldol by the use of aqueous alkali, less than 1 part of caustic alkali in aqueous solution being used for condensing 100 parts of acetaldehyde.

11. A process for the manufacture of aldol from acetaldehyde which consists in first neutralizing the acetic acid contained in the acetaldehyde by aqueous caustic alkali and then condensing the acetaldehyde to aldol by the use of aqueous caustic alkali with cooling.

12. A process for the manufacture of aldol from acetaldehyde, which consists in first neutralizing the acetic acid contained in the acetaldehyde and then condensing the aldehyde to aldol by the addition of a catalyzer with alkaline reaction, acid being added to the condensation liquid in the case of an excessive addition of catalyzer and consequent too violent condensation reaction.

13. A process for the manufacture of aldol from acetaldehyde which consists in first neutralizing the acetic acid contained in the acetaldehyde by aqueous caustic alkali and then condensing the acetaldehyde to aldol by the use of aqueous caustic alkali, acid being added to the condensation liquid in the case of an excessive addition of the catalyzer and consequent too violent condensation reaction.

In testimony whereof I have signed my name to this specification.

NATHAN GRÜNSTEIN.